Feb. 13, 1940.  N. SLUYTER  2,189,870

RESILIENT SUSPENSION DEVICE

Original Filed Jan. 30, 1937

Inventor,
Nicolaas Sluyter
By, [signature]
Atty.

Patented Feb. 13, 1940

2,189,870

UNITED STATES PATENT OFFICE 2,189,870

RESILIENT SUSPENSION DEVICE

Nicolaas Sluyter, Bloemendaal, Netherlands

Application January 30, 1937, Serial No. 123,284. Renewed July 8, 1939. In the Netherlands February 21, 1936

6 Claims. (Cl. 267—63)

This invention relates to a resilient suspension device or cushioning device employing bodies of rubber as the medium for shock absorption or resilience. It is already known to employ rolling cylindrical or spherical bodies of rubber between rigid co-operating surfaces, for example of a conical nature, so that when a load is applied between the parts having the surface compression of the rubber occurs. The present invention seeks to improve on such device by giving a progress effect and permitting the control of the degree of compression and therefore of resilient resistance in accordance with the applied load. The device may be used on vehicles as a primary suspension or springing, or on such articles as bicycle saddles or other devices requiring resilient suspension.

Figure 1:
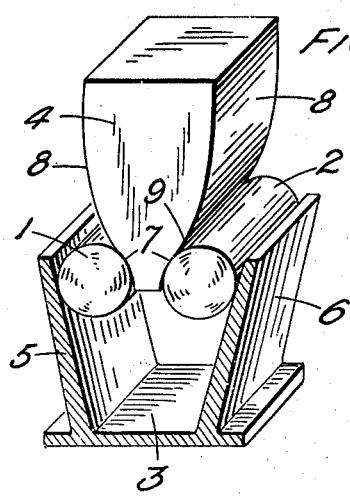
Figure 2:
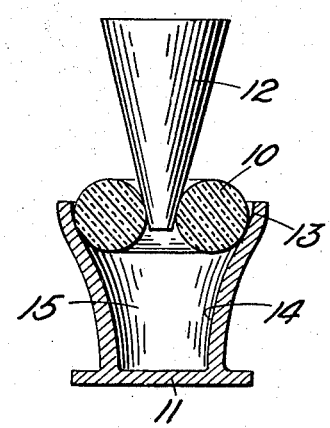
Figure 3:
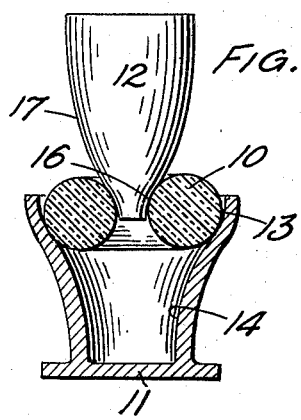
Figure 4:
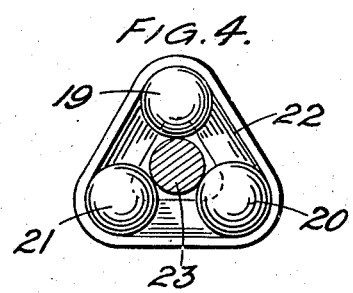
Figure 5:
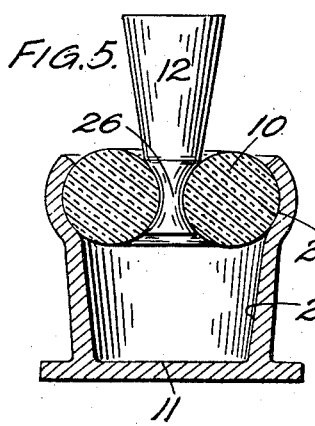
Figure 6:
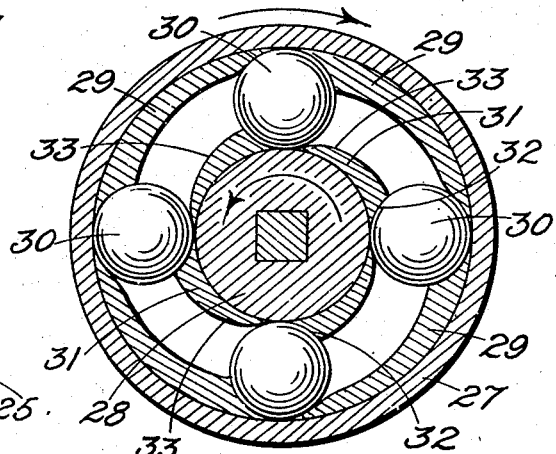

The invention is shown in the appended drawing of which in diagram Fig. 1 is a perspective view of a form of the invention, Fig. 2 a partly sectioned view of an alternative, Fig. 3 virtually a modification of Fig. 2, Fig. 4 a plan view showing an alternative arrangement, Fig. 5 a partly sectioned elevation of a modification of Figs. 2 and 3 and, Fig. 6 a cross sectional view of a torsional type of shock absorber or resilient device.

In Fig. 1 there are shown two solid rubber rollers 1 and 2 and these are disposed between a fixed body having a base 3 and upwardly divergent flat walls 5 and 6. Between the rollers 1 and 2 there is engaged a moving body with walls 8 having reflex curvature concave in the region of 7 and convex in the region of 9 and having a solid base part 4. When at rest or lightly loaded as to compression between 3 and 4, the rollers 1 and 2 may be lightly compressed or merely held and they repose in the curvatures at 7. As compression between 3 and 4 increases, so 4 descends between walls 5 and 6. The rollers 1 and 2 roll about their axes and are squeezed and by virtue of the reflex curvature the rate of their compression increases, rapidly at first and then less rapidly, so that in effect a strongly increasing compression over a short movement between 3 and 4 is followed by a more slightly increasing compression over a longer overall movement.

In Fig. 2 the reflex curvature is formed in the fixed member; a base 11 has a flared or bell-like wall which is convex at 14 and concave at 13. In the unloaded state, a solid rubber ring 10 rests in 13 and there enters the ring a rectilinear cone 12. As 12 is thrust by a load towards 11, so the ring 10 rolls upon itself and is compressed the change of curvature from 13 to 14, within the hole 15 accomplishing the same result as in the case of Fig. 1.

Fig. 3 shows a device similar to Fig. 2, except that in this case the ring 10 lies initially in the concavity 16 of the member 12 which concavity upwardly merges into a convexly curved part 17. The modification from Fig. 2 therefore consists virtually in substituting a reflexly curved surface for the rectilinear cone of the body 12. The effect of the invention is clearly capable of being considerably augmented by this means.

Fig. 4 is intended to show an alternative arrangement where rubber spheres are used instead of a ring or cylindrical roller. The fixed wall as shown at 22, the moving part at 23 and between them are three balls of rubber 19, 20 and 21, the fixed part 22 being given a triangular shape in plan, with the triangle apices curved approximately or exactly to the radii of the balls 19, 20 and 21.

Fig. 5 shows a fixed part 11 with an upstanding slightly conical wall 24 forming a sort of body the upper edge of which has just within it a concave annular recess 25 accommodating (when unloaded) either a series of balls or a rubber ring 10. The moving element 12 is for the most part rectilinearly conical but at its bottom end is concavely waisted at 26. The curvature at 26 corresponding to that at 25 so that the roller 10 is nested there between. Here again a considerable initial compression between 11 and 12 may be required than at the first stage of movement and this will comparatively highly compress the roller 10; therefore overall compression or load will thereafter result in a less rate of compression of the rubber.

Fig. 6 is a departure in form from the foregoing examples and is applicable to a shock absorber or suspension device of torsional form. It is conceived as an outer member 27 in the form of a hollow cylinder and an inner member 28 representing, or mounted upon, a spindle. Within the cylinder 27 there are lining segments 29 which are fixed in 27 and which have inner surfaces which are spiral in form all in the same sense so that these parts 29 are like wedges. The adjacent ends of adjacent parts 29 are concavely formed so that after assembly arcuate boxes are formed for the rubber balls 30 or axially directed rubber roller. External of the sectional 20 there are fixed corresponding curved wedge pieces 31 the thick ends of which are, e. g. at 32 concavely formed for the abutment of the balls 30. The thin ends of the parts 31 sweep in a convex curve 33 of increasing radius towards the thick ends.

A considerable initial load in torsion, as shown by the arrows will have to be exerted between 27 and 28 in order to dislodge the balls 30 from the pockets which they sit in when unloaded and thereafter the balls will roll and simultaneously be compressed in the spaces between the parts 29 and 31, the latter rate of compression being less than the initial compression for dislodgment.

Where one of the bodies is said to be fixed and the other movable, the terminology is intended to imply that the bodies are relatively movable. For example, one body is intended to be attached to an axle and the other to a frame of a road vehicle and in general the two bodies are attached to two structures or members between which resilience is required.

I claim:

1. A resilient suspension device of the kind in which rolling rubber bodies are adapted to be compressed between convergent surfaces in accordance with an applied load having in combination co-operating surfaces convergent in the direction of intended load and compressible rollers adapted to be compressed therebetween, the surfaces being adapted to apply a greater degree of compression to the compressible rollers during initial movement under load than later movement under load.

2. A resilient suspension device comprising a body having convergent wall surfaces, a second body having similarly convergent wall surfaces with curvature varying the degree of convergence and compressible rollers freely disposed between these bodies and adapted to be compressed and rolled by load applied between the bodies to a greater extent under initial movement under load than under later movement under load.

3. A torsionally resilient device comprising a hollow outer body, a sectional-like inner body adapted for rotation within the outer body and convergently curved surfaces on the inner surface of the outer body and outer surface of the inner body, compressible rollers disposed between the two bodies, said surfaces being so formed that the rollers are compressed at a larger rate initially than latterly upon relative rotation taking place between the bodies.

4. A resilient suspension device comprising elements which are relatively movable under load, resilient elements arranged between the elements and compressible in such relative movement, the member-engaging surface of at least one of the elements acting to apply a greater rate of compression under initial load responsive relative movement of the elements than under subsequent load responsive relative movement thereof.

5. A resilient suspension device having a conical hollow body, the internal wall of which is reflexly curved to present a convex surface remote from and a concave surface near to its mouth, and a second conical body to cooperate with the first mentioned body, said second conical body being reflexly curved to have a conical part near its narrow extremity merging into a concave part more remote from its extremity, and a rubber roller between said bodies.

6. A resilient suspension device having a conical hollow body, the internal wall of which is reflexly curved to present a concave surface remote from its mouth and formed adjacent its mouth with a convex annular recess, a second body having a conical wall with concavely curved waisted part toward the extremity thereof, and a rubber roller interposed between said bodies.

NICOLAAS SLUYTER.